(12) United States Patent
Kim et al.

(10) Patent No.: US 12,378,374 B2
(45) Date of Patent: *Aug. 5, 2025

(54) POLYMER COMPOSITE

(71) Applicant: LG Chem, Ltd., Seoul (KR)

(72) Inventors: Yulliana Kim, Daejeon (KR); In Young Kim, Daejeon (KR); Kwang Seoung Jeon, Daejeon (KR); Minsung Park, Daejeon (KR); Ji Hwan Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 305 days.

This patent is subject to a terminal disclaimer.

(21) Appl. No.: 17/925,484

(22) PCT Filed: Mar. 7, 2022

(86) PCT No.: PCT/KR2022/003159
§ 371 (c)(1),
(2) Date: Nov. 15, 2022

(87) PCT Pub. No.: WO2022/186669
PCT Pub. Date: Sep. 9, 2022

(65) Prior Publication Data
US 2023/0183432 A1 Jun. 15, 2023

(30) Foreign Application Priority Data

Mar. 5, 2021 (KR) .................. 10-2021-0029734
Mar. 4, 2022 (KR) .................. 10-2022-0028337

(51) Int. Cl.
*C08J 3/22* (2006.01)
*C08J 5/04* (2006.01)
*C08K 7/02* (2006.01)

(52) U.S. Cl.
CPC ............ *C08J 5/045* (2013.01); *C08J 3/22* (2013.01); *C08K 7/02* (2013.01); *C08J 2301/02* (2013.01); *C08J 2323/12* (2013.01)

(58) Field of Classification Search
CPC .......... C08J 5/045; C08J 3/22; C08J 2301/02; C08J 2323/12; C08L 2205/16; C08L 23/12; C08K 7/02
USPC ............................................. 523/351
See application file for complete search history.

(56) References Cited

U.S. PATENT DOCUMENTS

| | | |
|---|---|---|
| 3,997,503 A | 12/1976 | Henman et al. |
| 4,374,178 A | 2/1983 | Kulkarni et al. |
| 5,536,369 A | 7/1996 | Norlander |
| 6,270,883 B1 | 8/2001 | Sears et al. |
| 6,730,249 B2 | 5/2004 | Sears et al. |
| 8,722,773 B2 | 5/2014 | Hamilton et al. |
| 9,698,336 B2 | 7/2017 | Kim et al. |
| 10,450,452 B2 | 10/2019 | Lummerstorfer et al. |
| 10,794,006 B2 | 10/2020 | Phipps et al. |
| 2002/0000683 A1 | 1/2002 | Sears et al. |
| 2006/0036012 A1 | 2/2006 | Hayes et al. |
| 2009/0065975 A1 | 3/2009 | Sain et al. |
| 2010/0203313 A1 | 8/2010 | Olsson et al. |
| 2011/0175252 A1 | 7/2011 | Liu et al. |
| 2012/0136146 A1 | 5/2012 | Heiskanen et al. |
| 2012/0160433 A1 | 6/2012 | Vehvilainen et al. |
| 2012/0208933 A1 | 8/2012 | Hamilton et al. |
| 2013/0209772 A1 | 8/2013 | Sandstrom et al. |
| 2014/0182797 A1 | 7/2014 | Paltakari et al. |
| 2014/0272397 A1 | 9/2014 | Kim et al. |
| 2015/0357099 A1 | 12/2015 | Galland et al. |
| 2016/0208153 A1 | 7/2016 | Hede et al. |
| 2017/0058419 A1 | 3/2017 | Kim et al. |
| 2017/0072472 A1 | 3/2017 | Isogai |
| 2017/0306562 A1 | 10/2017 | Phipps et al. |
| 2018/0094181 A1 | 4/2018 | Tominaga et al. |
| 2019/0112478 A1 | 4/2019 | Peace et al. |
| 2019/0112479 A1 | 4/2019 | Peace et al. |
| 2019/0127556 A1 | 5/2019 | Maclean et al. |
| 2019/0241725 A1 | 8/2019 | Lummerstorfer et al. |
| 2020/0040531 A1 | 2/2020 | Thitiwutthisakul et al. |
| 2020/0062921 A1 | 2/2020 | Hara et al. |
| 2020/0157318 A1 | 5/2020 | Seo et al. |
| 2020/0199330 A1 | 6/2020 | Maclean et al. |
| 2020/0216624 A1 | 7/2020 | Hamilton et al. |
| 2020/0238333 A1 | 7/2020 | Itoh et al. |
| 2020/0248405 A1 | 8/2020 | Momin et al. |
| 2020/0306794 A1 | 10/2020 | Kuramochi et al. |
| 2020/0398308 A1 | 12/2020 | Okazaki et al. |
| 2020/0399832 A1 | 12/2020 | Phipps et al. |

(Continued)

FOREIGN PATENT DOCUMENTS

| | | |
|---|---|---|
| CN | 101647077 A | 2/2010 |
| CN | 102317542 A | 1/2012 |

(Continued)

OTHER PUBLICATIONS

Extended European Search Report including Written Opinion for Application No. 21813867.5 dated Nov. 3, 2022, pp. 1-6.
Extended European Search Report including Written Opinion for Application No. 21814089.5 dated Nov. 3, 2022, pp. 1-9.
Extended European Search Report including Written Opinion for Application No. 21814301.4 dated Nov. 10, 2022, pp. 1-11.
International Search Report for Application No. PCT/KR2022/003159 mailed Jun. 27, 2022, pp. 1-3.
Sahoo, K., et al., "Study of ultraviolet sensing properties of ZnO nanoparticles grown on cellulose fibers." Materials Today: Proceedings, Aug. 31, 2019, vol. 18, pp. 1156-1161.
International Search Report for Application No. PCT/KR2021/006738, mailed Aug. 30, 2021.
Vainio, U., et al., "Copper and copper oxide nanoparticles in a cellulose support studied using anomalous small-angle X-ray scattering." The European Physical Journal D, vol. 42, Published online: Jan. 31, 2007, pp. 93-101.

(Continued)

*Primary Examiner* — Hannah J Pak
(74) *Attorney, Agent, or Firm* — Lerner David LLP

(57) ABSTRACT

The present disclosure relates to a polymer composite. According to the present disclosure, there is provided a polymer composite capable of exhibiting improved light resistance while being environmentally friendly by containing microcellulose fibers fibrillated by the growth of inorganic particles as a reinforcing material.

13 Claims, 5 Drawing Sheets

(56) References Cited

U.S. PATENT DOCUMENTS

| | | |
|---|---|---|
| 2021/0025109 A1 | 1/2021 | Hasegawa et al. |
| 2021/0087713 A1 | 3/2021 | Fukui et al. |
| 2021/0102341 A1 | 4/2021 | Fukuoka et al. |
| 2021/0198463 A1 | 7/2021 | Ikura et al. |
| 2021/0222006 A1 | 7/2021 | Ono et al. |
| 2021/0261781 A1 | 8/2021 | Gane et al. |
| 2021/0285156 A1 | 9/2021 | Laleg et al. |
| 2022/0049071 A1 | 2/2022 | Matsusue et al. |
| 2022/0064390 A1 | 3/2022 | Backfolk et al. |
| 2022/0372263 A1* | 11/2022 | Lee ................... D06M 11/83 |
| 2023/0272557 A1 | 8/2023 | Park et al. |
| 2024/0166827 A1* | 5/2024 | Park ........................ C08K 3/22 |
| 2024/0166851 A1* | 5/2024 | Park ........................ C08K 3/22 |
| 2024/0166855 A1* | 5/2024 | Hwang ..................... C08L 1/02 |

FOREIGN PATENT DOCUMENTS

| | | |
|---|---|---|
| CN | 102378777 A | 3/2012 |
| CN | 104031366 A | 9/2014 |
| CN | 105531345 A | 4/2016 |
| CN | 108589266 A | 9/2018 |
| CN | 109162086 A | 1/2019 |
| CN | 109790681 A | 5/2019 |
| CN | 110041564 A | 7/2019 |
| CN | 110139959 A | 8/2019 |
| CN | 110382601 A | 10/2019 |
| CN | 111452352 A | 7/2020 |
| CN | 107793711 B | 9/2020 |
| CN | 107793708 B | 11/2020 |
| EP | 2236545 A1 | 10/2010 |
| EP | 2554588 A1 | 2/2013 |
| EP | 3441436 A1 | 2/2019 |
| JP | H8259844 A | 10/1996 |
| JP | 3194241 B2 | 7/2001 |
| JP | 3704280 B2 | 10/2005 |
| JP | 2010143992 A | 7/2010 |
| JP | 2010221622 A | 10/2010 |
| JP | 2011088997 A | 5/2011 |
| JP | 2012007247 A | 1/2012 |
| JP | 2012087199 A | 5/2012 |
| JP | 2012532952 A | 12/2012 |
| JP | 2013035903 A | 2/2013 |
| JP | 2014-055323 A | 3/2014 |
| JP | 2014088478 A | 5/2014 |
| JP | 2015-513569 A | 5/2015 |
| JP | 2015221844 A | 12/2015 |
| JP | 2016176055 A | 10/2016 |
| JP | 2017226754 A | 12/2017 |
| JP | 2018193551 A | 12/2018 |
| JP | 6446834 B2 | 1/2019 |
| JP | 2019011523 A | 1/2019 |
| JP | 2019500508 A | 1/2019 |
| JP | 2019512591 A | 5/2019 |
| JP | 2019099687 A | 6/2019 |
| JP | 2019119983 A | 7/2019 |
| JP | 2020007496 A | 1/2020 |
| JP | 2020070379 A | 5/2020 |
| JP | 6733076 B2 | 7/2020 |
| JP | 2020114924 A | 7/2020 |
| JP | 2022548882 A | 11/2022 |
| KR | 20010075598 A | 8/2001 |
| KR | 20080086976 A | 9/2008 |
| KR | 20090078170 A | 7/2009 |
| KR | 20110120250 A | 11/2011 |
| KR | 101254784 B1 | 4/2013 |
| KR | 101407092 B1 | 6/2014 |
| KR | 101415636 B1 | 7/2014 |
| KR | 20160062765 A | 6/2016 |
| KR | 20170025551 A | 3/2017 |
| KR | 101808014 B1 | 12/2017 |
| KR | 101979185 B1 | 5/2019 |
| KR | 102017583 B1 | 10/2019 |
| KR | 20200115665 A | 10/2020 |
| KR | 102179831 B1 | 11/2020 |
| WO | 2013120752 A1 | 8/2013 |
| WO | 2015-170613 A1 | 11/2015 |
| WO | 2018105174 A1 | 6/2018 |
| WO | 2019065961 A1 | 4/2019 |
| WO | 2019142639 A1 | 7/2019 |
| WO | 2019163873 A1 | 8/2019 |
| WO | 2019203344 A1 | 10/2019 |
| WO | 2020050286 A1 | 3/2020 |
| WO | 2020071434 A1 | 4/2020 |
| WO | 2021242069 A1 | 12/2021 |
| WO | 2023018030 A1 | 2/2023 |
| WO | 2023018031 A1 | 2/2023 |
| WO | 2023018033 A1 | 2/2023 |

OTHER PUBLICATIONS

Sahoo, K., et al., "ZnO—cellulose Nanocomposite Powder For Application In UV Sensors." AIP Conference Process Proceedings, vol. 1832, Issue No. 1, Published online: May 23, 2017, document No. 050090, pp. 1-3.

International Search Report for Application No. PCT/KR2021/006741, mailed Sep. 9, 2021.

International Search Report for Application No. PCT/KR2021/006743, mailed Sep. 15, 2021.

Liu Jie et al: "Soluble soybean polysaccharide/nano zine oxide antimicrobial nanocomposite films reinforced with microfibrillated cellulose", International Journal of Biological Macromolecules, Elsevier BV, NL, vol. 159, May 16, 2020 (May 16, 2020), 793-803, XP086248301.

Extended European Search Report for Application No. 22763650.3 dated Sep. 13, 2023, 8 pgs.

Oromiehie, "Chemical Modification of Polypropylene by Maleic Anhydride: Melt Grafting, Characterization, and Mechanism," 2014, International Journal of Chemical Engineering and Applications, 5, 2, 117-122. (Year: 2014).

* cited by examiner

[FIG. 1A]
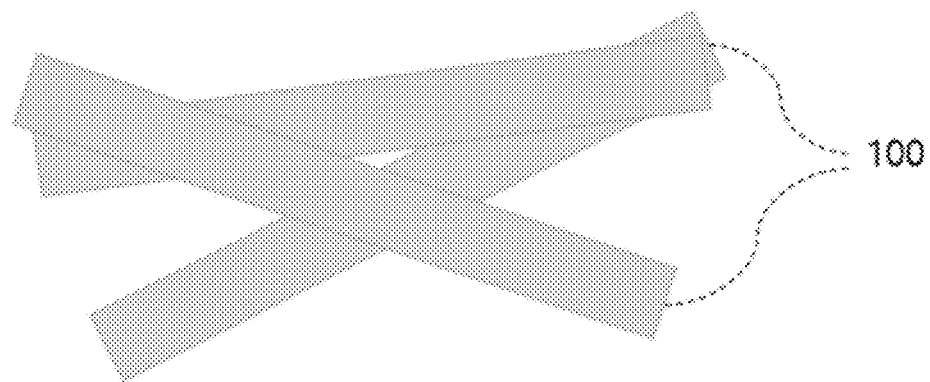
[FIG. 1B]
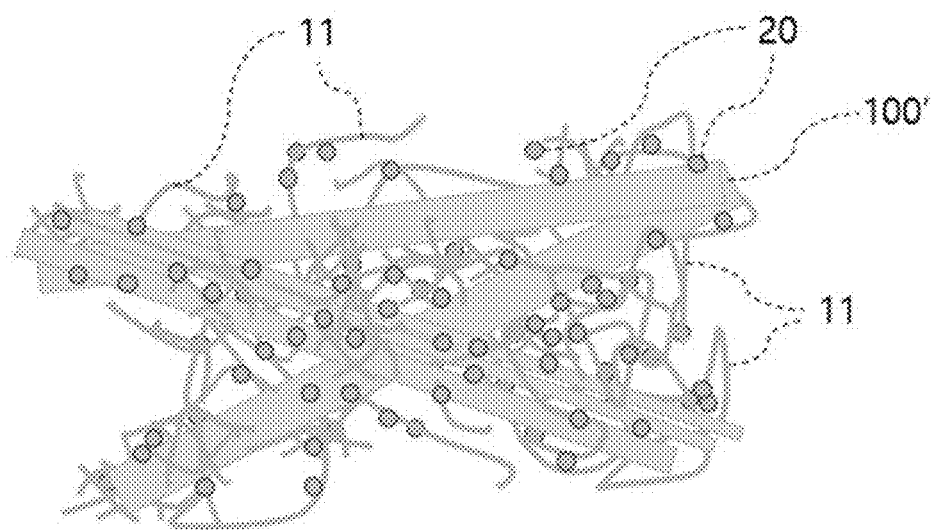

[FIG. 2]
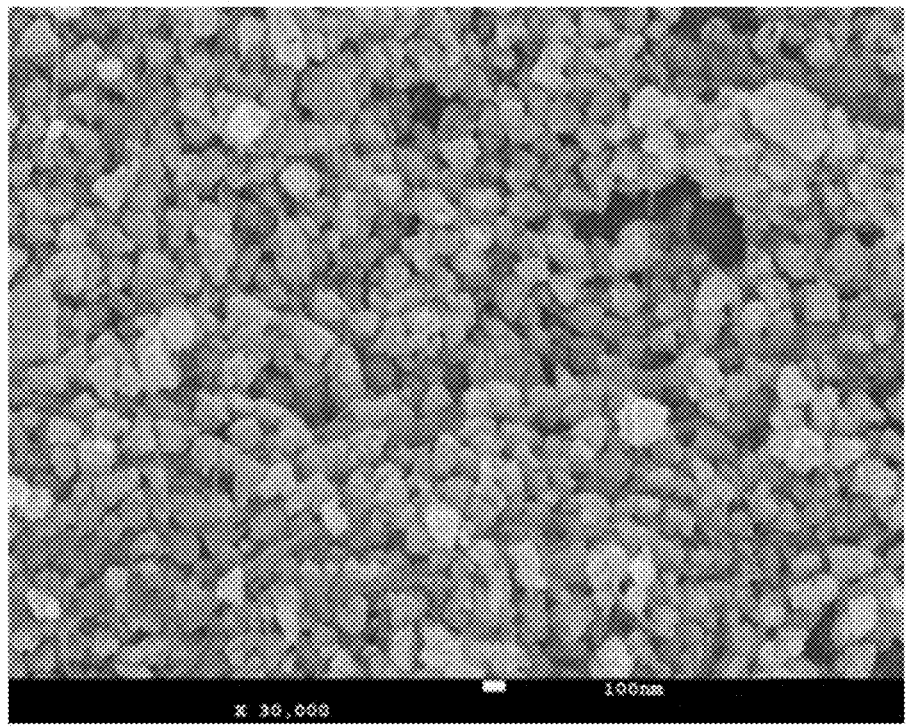
[FIG. 3]
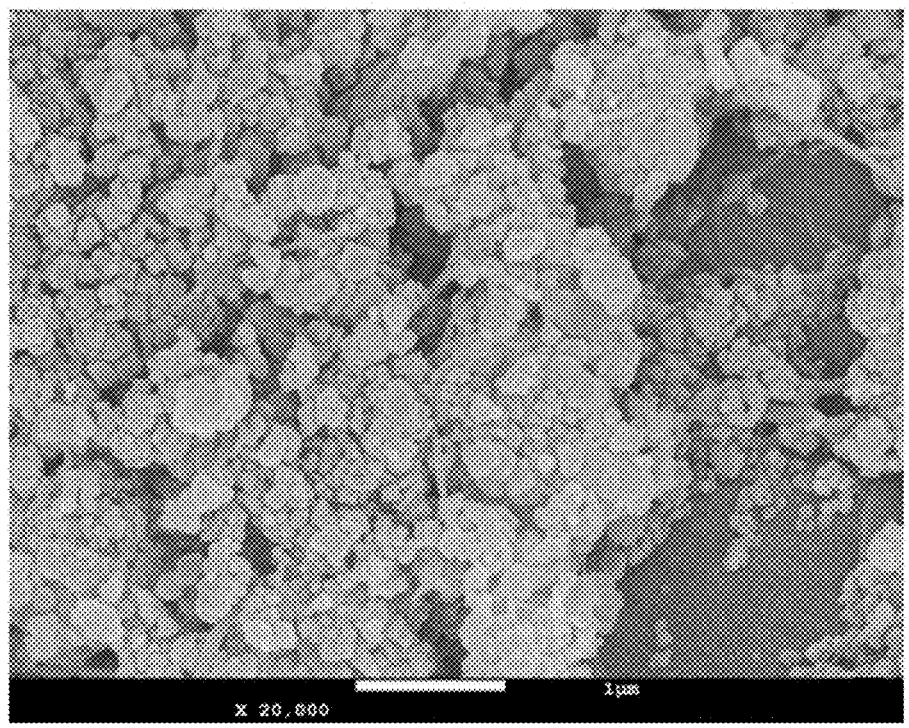

[FIG. 4A]
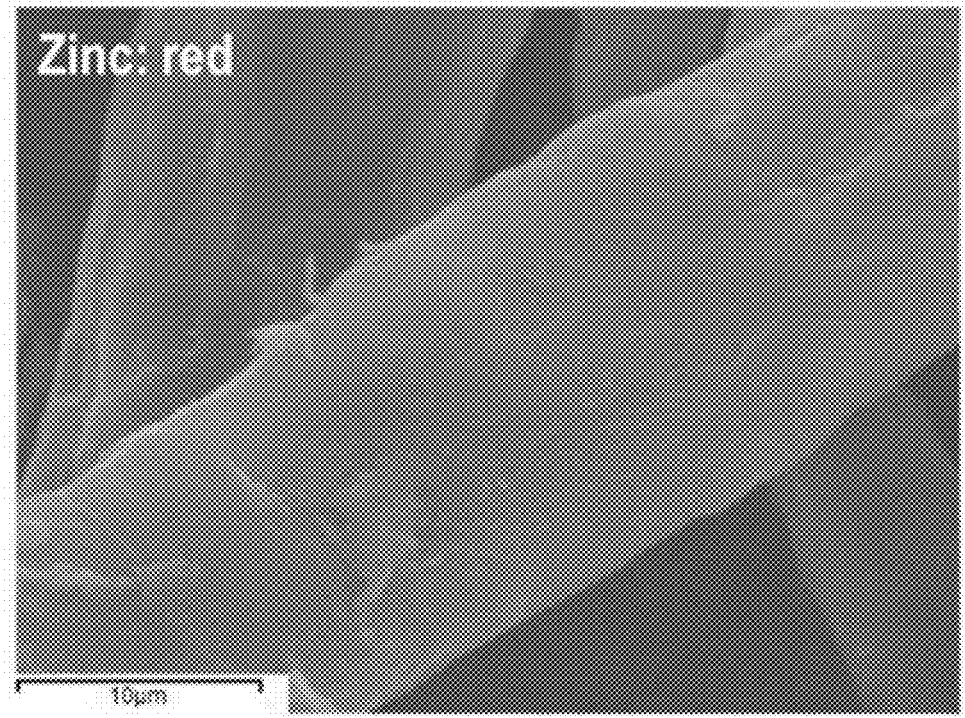
[FIG. 4B]
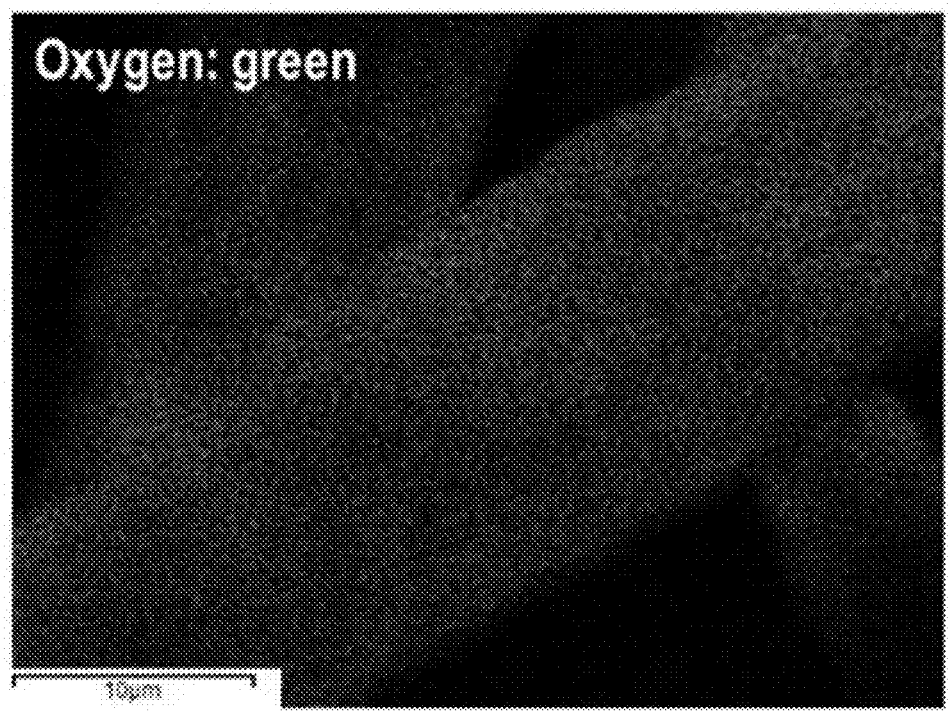

【FIG. 5A】
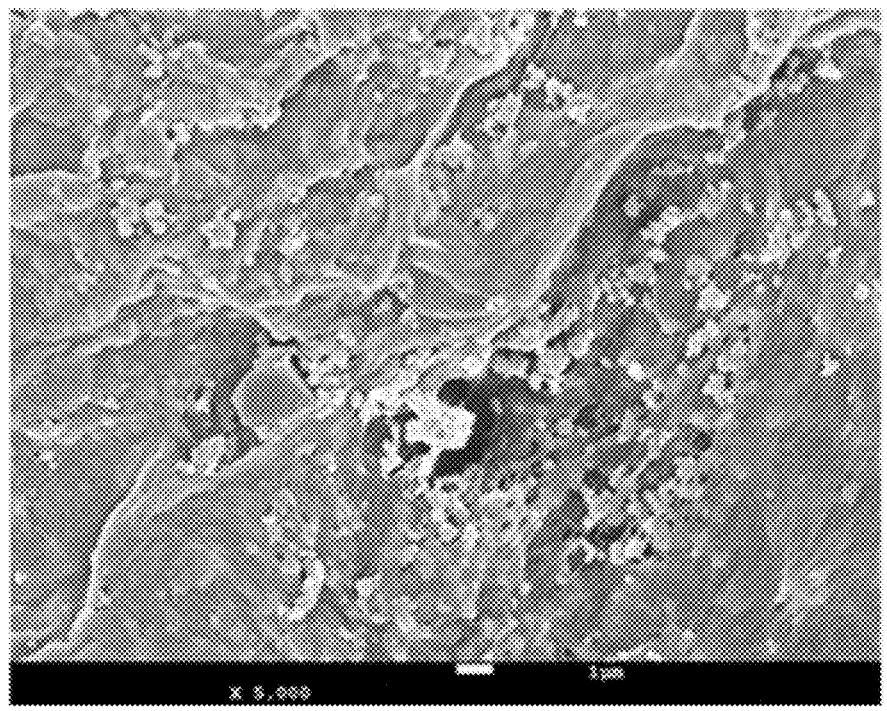
【FIG. 5B】
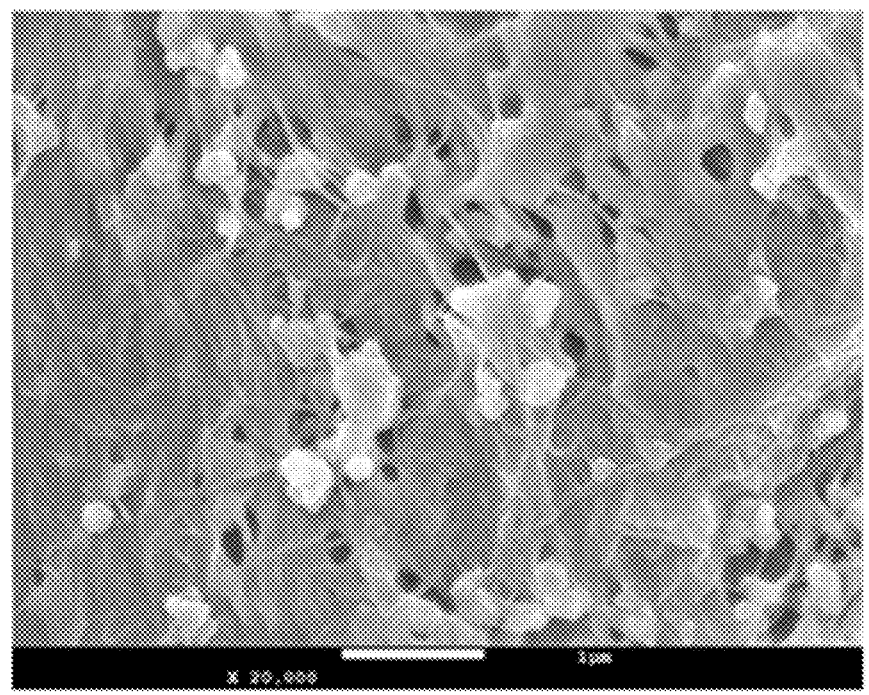

[FIG. 6]
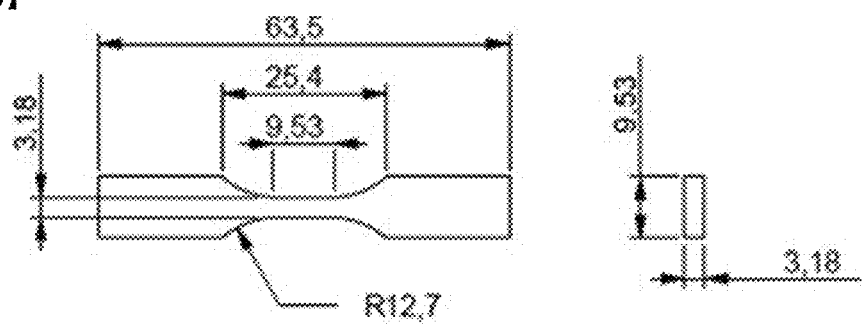

POLYMER COMPOSITE

CROSS-REFERENCE TO RELATED APPLICATION(S)

The present application is a national stage entry under 35 U.S.C. § 371 of International Application No. PCT/KR2022/003159 filed on Mar. 7, 2022, which claims priority from Korean Patent Applications No. 10-2021-0029734 filed on Mar. 5, 2021 and No. 10-2022-0028337 filed on Mar. 4, 2022, all the disclosures of which are incorporated herein by reference.

TECHNICAL FIELD

The present disclosure relates to a polymer composite containing fibrillated microcellulose fibers.

BACKGROUND OF ART

Cellulose pulp refers to a lignocellulosic fibrous material obtained by chemically or mechanically separating cellulose fibers from wood, fiber crops, waste paper, rags, or the like. Cellulose fibers are mainly used in the paper industry, and are used as raw materials for nanocellulose.

Nanocellulose is being applied to research to improve physical properties of polymers by complexation with polymers. It is easy to recycle the polymer composite to which environmentally friendly nanocellulose is applied as a reinforcing material, unlike a polymer composite to which glass fiber is applied.

However, the process for producing nanocellulose from the cellulose fibers is complicated and costly. In addition, there is a problem in that the cellulose fibers are deteriorated due to a high temperature in the process of complexation with polymers. Further, since the cellulose fibers and nanocellulose are easily aggregated in the polymer composite, it is very difficult to disperse them in the nanoscale, and thus there is a limitation in obtaining a sufficient reinforcing effect.

DETAILED DESCRIPTION OF THE INVENTION

Technical Problem

In the present disclosure, there is provided a polymer composite capable of exhibiting improved light resistance while being environmentally friendly by containing cellulose fibers as a reinforcing material.

Technical Solution

Hereinafter, the polymer composite according to embodiments of the present invention will be described.

The terms are used merely to refer to specific embodiments, and are not intended to restrict the present disclosure unless it is explicitly expressed.

Singular expressions of the present disclosure may include plural expressions unless they are differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

As used herein, 'nanofiber' or 'nanofibrils' refers to a fiber having a minor axis diameter in the nanometer range, and 'microfiber' refers to a fiber having a minor axis diameter in the micrometer range. For example, the microfiber may be composed of a bundle of the nanofibers.

As used herein, 'fiber' refers to a lignocellulosic fibrous material obtained by chemically or mechanically separating cellulose fibers from wood, fiber crops, waste paper, rags, or the like.

As used herein, 'pulp fiber', 'cellulose fiber' or 'microcellulose fiber' refers to a microfiber made of cellulose. As used herein, 'cellulose nanofiber' or 'nanocellulose fiber' refers to a nanofiber made of cellulose.

As used herein, 'fibrillation' refers to a phenomenon in which nanofibrils forming the internal structure of microcellulose fibers are released and raised like fluff on the microcellulose fibers.

As used herein, 'fibrillated cellulose fiber' refers to a microcellulose fiber in a state in which nanofibrils having a minor axis diameter in the nanometer range are raised like fluff on the microcellulose fiber by the fibrillation.

As a result of continuous research by the present inventors, it was confirmed that fibrillated cellulose fibers obtained by growing inorganic particles on the cellulose fibers could exhibit a polymer reinforcing effect comparable to nanocellulose obtained by nanosizing the cellulose fibers.

In particular, the inorganic particles included in the fibrillated cellulose fibers can delay the deterioration of the fiber due to a high temperature in the process of complexation with polymers, thereby enabling the expression of an excellent reinforcing effect.

In addition, the inorganic particles included in the fibrillated cellulose fibers enable the provision of a polymer composite having improved light resistance.

According to an embodiment of the present disclosure, there is provided a polymer composite containing a polymer matrix; microcellulose fibers; and a compatibilizer, and satisfying the following Equation 1:

$$2 \leq \Delta E^*_{ab} \leq 15 \qquad \text{[Equation 1]}$$

in the Equation 1, $\Delta E^*_{ab}$ is a color difference of the polymer composite, and the color difference is obtained according to the following formula of $[(L^*_t - L^*_0)^2 + (a^*_t - a^*_0)^2 + (b^*_t - b^*_0)^2]^{1/2}$ in the L*a*b* color space measured using a colorimeter, wherein $L^*0$, $a^*0$ and $b^*0$ are initial chromaticity values of the polymer composite, and $L^*_t$, $a^*_t$ and $b^*_t$ are chromaticity values of the polymer composite after exposing the polymer composite to a light source (fluorescent UV lamp) for 480 hours under the conditions of 0.75 W/(m²·nm) at 340 nm and 45±1° C.

The polymer composite contains the microcellulose fibers and the compatibilizer dispersed in the polymer matrix.

The polymer matrix may be a thermoplastic resin.

For example, the polymer matrix may be at least one polymer selected from the group consisting of polyolefin, polyamide, styrenic polymer, and polycarbonate.

Specifically, the polymer matrix may be polyolefins such as polyethylene, polyethylene-based copolymer, polypropylene, and polypropylene-based copolymer; aliphatic polyamides such as nylon-6 and nylon-66; aromatic polyamides such as aramid; styrenic polymers such as polystyrene, acrylonitrile-butadiene-styrene copolymer, styrene-maleic anhydride copolymer, styrene-acrylonitrile copolymer, and styrene-butadiene-styrene copolymer; and polycarbonates obtained by polymerizing a polyol including bisphenol A, polyether polyol, polyester polyol, or a mixture thereof and phosgene.

Preferably, the polymer matrix may include at least one polymer resin selected from the group consisting of polyethylene, polyethylene-based copolymer, polypropylene (especially homo polypropylene), polypropylene-based copolymer, nylon-6, nylon-66, aramid, polystyrene, acrylonitrile-butadiene-styrene copolymer, styrene-maleic anhydride copolymer, styrene-acrylonitrile copolymer, and styrene-butadiene-styrene copolymer, and polycarbonate.

In addition, it may be advantageous for the polymer matrix to have a melt flow rate (MFR) of 40 g/10 min to 70 g/10 min, 45 g/10 min to 70 g/10 min, 45 g/10 min to 65 g/10 min, 50 g/10 min to 65 g/10 min, or 50 g/10 min to 60 g/10 min for the expression of the effect according to the present disclosure. The MFR of the polymer matrix may be measured according to ASTM D1238.

According to an embodiment of the present disclosure, the polymer composite contains the microcellulose fibers dispersed in the polymer matrix.

The microcellulose fiber refers to a fiber having a minor axis diameter in the micrometer range.

Preferably, the microcellulose fibers are cellulose fibers fibrillated by the growth of inorganic particles.

The cellulose fibers may be natural cellulose fibers obtained from wood such as softwoods or hardwoods.

In general, fibrillation of microcellulose fibers means a phenomenon in which relatively large fibrils forming a membrane of cellulose fibers and their internal tissues are released through a process such as beating, and fine microfibrils are formed on the surface like fluff.

In the present disclosure, the microcellulose fibers are fibrillated cellulose fibers by growing inorganic particles on the microcellulose fibers. That is, the microcellulose fibers may be fibers in which some of the fibrils forming the microcellulose fibers are released or defibrated by the growth of the inorganic particles on the microcellulose fibers.

FIG. 1A is an enlarged schematic view of non-fibrillated microcellulose fibers and FIG. 1B is an enlarged schematic view of microcellulose fibers including nanofibrils and inorganic particles.

In FIG. 1A, the non-fibrillated microcellulose fiber 100 is a fiber having a minor axis diameter in the micrometer range. Referring to FIG. 1B, when inorganic particles are grown on the cellulose fibers, some of the fibrils forming the microcellulose fibers 100' are released by the growth of the inorganic particles 20, thereby forming a fiber in which nanofibrils 11 are raised on the microcellulose fibers 100' like fluff. Also, the nanofibrils 11 may be present inside the microcellulose fibers 100' through fibrillation by the growth of the inorganic particles 20.

For example, the microcellulose fibers include nanofibrils and inorganic particles. Herein, the nanofibrils may be bonded to a surface of the microcellulose fibers, or may be present inside the microcellulose fibers. In addition, the inorganic particles may be bonded to the nanofibrils or bonded to a surface or inside of the microcellulose fibers.

In the microcellulose fibers including nanofibrils and inorganic particles, the microcellulose fibers may have a minor axis diameter of 1 μm or more; and 30 μm or less, 25 μm or less, 20 μm or less, 15 μm or less, or 10 μm or less. Specifically, the microcellulose fibers may have an average minor axis diameter of 5 μm to 30 μm, 5 μm to 25 μm, 10 μm to 20 μm, or 15 μm to 20 μm.

And, in the microcellulose fibers including nanofibrils and inorganic particles, the nanofibrils may have a minor axis diameter of 10 nm or more, 20 nm or more, 30 nm or more, 40 nm or more, or 50 nm or more; and 400 nm or less, 350 nm or less, 300 nm or less, 250 nm or less, 200 nm or less, 150 nm or less, or 100 nm or less. Specifically, the nanofibrils may have a minor axis diameter of 10 nm to 400 nm, 10 nm to 350 nm, 10 nm to 300 nm, 20 nm to 300 nm, 20 nm to 250 nm, 30 nm to 250 nm, 30 nm to 200 nm, 40 nm to 200 nm, 40 nm to 150 nm, 50 nm to 150 nm, or 50 nm to 100 nm.

The lengths of the microcellulose fibers and the nanofibrils are not particularly limited.

The microcellulose fibers including nanofibrils and inorganic particles may be prepared by adding a reducing agent, a catalyst, a ligand, or a mixture thereof to a mixture containing microcellulose fibers, an inorganic particle precursor, and a solvent to grow inorganic particles from the inorganic particle precursor distributed on the cellulose fibers.

For example, in the above process, a mixture containing microcellulose fibers, an inorganic particle precursor and a solvent is prepared.

An appropriate solvent capable of dissolving the inorganic particle precursor and swelling the microcellulose fibers may be used as the solvent. For example, water, alcohol (e.g., lower alcohol such as methanol, ethanol, propanol or butanol), dimethyl sulfoxide (DMSO), sodium hydroxide solution, ammonia solution, urea solution, or a mixture thereof may be used.

The solvent may be used in an amount of 1000 parts by weight to 10000 parts by weight based on 100 parts by weight of the microcellulose fibers. Within this range, the microcellulose fibers are sufficiently swollen, and fluidity of the inorganic particle precursor is ensured, so that the inorganic particle precursor can be uniformly dispersed on the microcellulose fibers.

It is possible to provide polymer composites having various physical properties depending on the type of inorganic particles grown on the microcellulose fibers. That is, the inorganic particle precursor may be appropriately selected according to physical properties to be imparted to the polymer composite. For example, for the purpose of imparting antibacterial property and heat resistance to the polymer composite, an inorganic particle precursor capable of growing zinc oxide may be selected.

For example, the inorganic particles may include at least one element selected from the group consisting of copper, zinc, calcium, aluminum, iron, silver, platinum, palladium, ruthenium, iridium, rhodium, osmium, chromium, cobalt, nickel, manganese, vanadium, molybdenum, magnesium, strontium, titanium, zirconium, hafnium, and gallium. The components of the inorganic particles may be one type or two or more types.

The inorganic particle precursor may be a salt of at least one element selected from the group consisting of copper, zinc, calcium, aluminum, iron, silver, platinum, palladium, ruthenium, iridium, rhodium, osmium, chromium, cobalt, nickel, manganese, vanadium, molybdenum, magnesium, strontium, titanium, zirconium, hafnium, and gallium. The salt may be an acetate, chloride, or nitrate. In addition, a silicon oxide precursor such as tetraethyl orthosilicate (TEOS) may be used as the inorganic particle precursor.

The inorganic particles may be contained in an amount of 1 to 40 parts by weight based on 100 parts by weight of the microcellulose fibers. Specifically, the inorganic particles may be contained in an amount of 1 part by weight or more, 5 parts by weight or more, or 8 parts by weight or more, and 40 parts by weight or less, 35 parts by weight or less, 30 parts by weight or less, or 25 parts by weight or less based on 100 parts by weight of the microcellulose fibers. Preferably, the inorganic particles may be contained in an amount of 1 to 40 parts by weight, 5 to 40 parts by weight, 5 to 35 parts by weight, 8 to 35 parts by weight, 8 to 30 parts by weight or 8 to 25 parts by weight based on 100 parts by weight of the microcellulose fibers.

The content of the inorganic particle precursor contained in the mixture may be controlled such that the content of inorganic particles finally prepared on the microcellulose fibers meets the above range. Within this range, sufficient fibrillation can be induced by uniformly distributing the inorganic particle precursor to the microcellulose fibers, thereby enabling the expression of improved light resistance.

The mixture may be prepared by dissolving the inorganic particle precursor in the solvent, and then adding microcellulose fibers thereto. The mixture is stirred to swell the microcellulose fibers, and at the same time, the inorganic particle precursor is evenly distributed on the swollen microcellulose fibers.

Herein, the type and content of the reducing agent, catalyst, and ligand contained in the mixture may be appropriately selected according to the added inorganic particle precursor, and the type and content of the inorganic particles to be grown. For example, the reducing agent may be sodium hydroxide (NaOH), a metal hydride-based reducing agent, a borohydride-based reducing agent, a borane-based reducing agent, a silane-based reducing agent, a hydrazine-based reducing agent, or a hydrazide-based reducing agent. As the catalyst, ammonia or urea may be used. As the ligand, benzene-1,3,5-tricarboxylate may be used.

FIG. 2, and FIGS. 4A and 4B are scanning electron microscope (SEM) images of microcellulose fibers fibrillated by the growth of the inorganic particles according to Preparation Example 1 below.

Referring to FIG. 2, it can be confirmed that fibrillation occurred by the growth of inorganic particles having a uniform particle diameter on the microcellulose fibers.

Referring to FIG. 4A, it can be confirmed that metal elements (zinc) are evenly distributed on the fibrillated microcellulose fibers by the growth of the inorganic particles. Referring to FIG. 4B, it can be confirmed that oxygen is evenly distributed on the fibrillated microcellulose fibers by the growth of the inorganic particles.

Optionally, after growing the inorganic particles on the microcellulose fibers, the inorganic particles may be modified to provide additional physical properties. For example, a process of modifying the inorganic particles by adding a lipophilic compound having a thiol group after growing the inorganic particles on the cellulose fibers may be additionally performed. By modifying the inorganic particles to be lipophilic, compatibility between the microcellulose fibers and the polymer matrix may be further improved. Examples of the lipophilic compound having a thiol group include 1-decanethiol, 1-undecanethiol, 1-dodecanethiol, 1-tetradecanethiol, 1-pentadecanethiol, 1-hexadecanethiol, 1-octadecanethiol, and the like.

Through the above process, the microcellulose fibers including nanofibrils and inorganic particles can be obtained.

According to an embodiment of the present disclosure, the inorganic particles included in the microcellulose fibers may have a minor axis diameter of 0.01 μm or more, 0.03 μm or more, or 0.05 μm or more; and 10 μm or less, 7 μm or less, or 5 μm or less. Preferably, the inorganic particles may have a minor axis diameter of 0.01 μm to 10 μm, 0.03 μm to 7 μm, or 0.05 μm to 5 μm.

When the diameter of the inorganic particles included in the microcellulose fibers is too large, the inorganic particles may act as defects, thereby reducing mechanical properties of the polymer composite. Thus, the diameter of the inorganic particles is preferably 10 μm or less, 7 μm or less, or 5 μm or less.

In addition, in order to improve light resistance while enabling fibrillation of the microcellulose fibers by the growth of inorganic particles, the diameter of the inorganic particles is preferably 0.01 μm or more, 0.03 μm or more, or 0.05 μm or more.

The inorganic particles may be spherical particles having a diameter of 0.01 μm to 10 μm. In addition, the inorganic particles may be columnar particles having a diameter of 0.01 μm to 10 μm on one axis and a diameter of 0.02 μm to 30 μm on another axis. In addition, the inorganic particles may include a mixture of the spherical particles and the columnar particles. The diameter of the inorganic particles may be measured using a scanning electron microscope. As a non-limiting example, the diameters, minor axis diameters, or major axis diameters of 20 inorganic particles are measured using a scanning electron microscope, respectively, and then an average value calculated by excluding the maximum and minimum values is obtained.

According to an embodiment of the present disclosure, the inorganic particles may be included in an amount of 1 parts by weight or more, 5 parts by weight or more, or 8 parts by weight or more; and 40 parts by weight or less, 35 parts by weight or less, 30 parts by weight or less, or 25 parts by weight or less based on 100 parts by weight of the microcellulose fibers. Preferably, the inorganic particles may be included in an amount of 1 to 40 parts by weight, 5 to 40 parts by weight, 5 to 35 parts by weight, 5 to 30 parts by weight, 8 to 30 parts by weight, or 8 to 25 parts by weight based on 100 parts by weight of the microcellulose fibers.

In order to sufficiently express the fibrillation effect of the microcellulose fibers by the growth of inorganic particles and light resistance, the inorganic particles are preferably included in an amount of 1 parts by weight or more, 5 parts by weight or more, or 8 parts by weight or more based on 100 parts by weight of the microcellulose fibers.

However, when the inorganic particles are included in an excessive amount on the microcellulose fibers, compatibility with the polymer matrix may be reduced, and thus mechanical properties of the polymer composite may be deteriorated. In addition, when the inorganic particles are included in an excessive amount, the inorganic particles are aggregated to form a non-uniform aggregate, and thus light resistance may be deteriorated. Therefore, the inorganic particles are preferably included in an amount of 40 parts by weight or less, 35 parts by weight or less, 30 parts by weight or less, or 25 parts by weight or less based on 100 parts by weight of the microcellulose fibers.

Meanwhile, the polymer composite may further include the compatibilizer dispersed on the polymer matrix. The compatibilizer is a component that helps the polymer matrix and the microcellulose fibers to be well blended with each other.

As the compatibilizer, those known in the art to which the present invention pertains may be used in consideration of the specific type of the polymer matrix.

Preferably, the compatibilizer may be a modified polyolefin. The modified polyolefin refers to a resin obtained by modifying a polyolefin with an unsaturated carboxylic acid or a derivative thereof.

The polyolefin forming the modified polyolefin may be a chain-type olefin such as ethylene, propylene, butene, pentene, hexene, and heptene; a cyclic olefin such as cyclopentene, cyclohexene, and 1,3-cyclopentadiene; an olefin substituted with an aromatic ring such as styrene, or the like.

The unsaturated carboxylic acid forming the modified polyolefin may include fumaric acid, maleic acid, itaconic acid, citraconic acid, aconitic acid, and anhydrides thereof.

As a non-limiting example, the modified polyolefin may be polypropylene or polyethylene in which 0.1 to 50 wt % thereof is grafted with maleic anhydride.

Preferably, it may be advantageous for the modified polyolefin to have an acid number of 1 mg KOH/g to 40 mg KOH/g, 5 mg KOH/g to 40 mg KOH/g, 5 mg KOH/g to 35 mg KOH/g, or 10 mg KOH/g to 35 mg KOH/g for the expression of the effect according to the present disclosure. The acid number means the amount of KOH expressed in mg-KOH/g-polymer required to neutralize the acid functionality as measured by titration. The acid number may be measured according to ASTMD-1386 (2010).

The modified polyolefin may further improve compatibility of the microcellulose fibers with the polymer matrix, thereby further improving mechanical properties of the polymer composite.

According to an embodiment of the present disclosure, the polymer composite may contain 30 to 90 wt % of the polymer matrix; 5 to 60 wt % of the microcellulose fibers; and 1 to 20 wt % of the compatibilizer.

Alternatively, the polymer composite may contain 35 to 90 wt % of the polymer matrix; 5 to 55 wt % of the microcellulose fibers; and 5 to 20 wt % of the compatibilizer.

Alternatively, the polymer composite may contain 35 to 85 wt % of the polymer matrix; 5 to 55 wt % of the microcellulose fibers; and 5 to 15 wt % of the compatibilizer.

In order to provide a polymer composite containing an appropriate amount of the matrix, the polymer matrix is preferably contained in the polymer composite in an amount of 30 wt % or more, or 35 wt % or more. In addition, for the expression of improved light resistance according to the present disclosure, the polymer matrix is preferably contained in the polymer composite in an amount of 90 wt % or less, or 85 wt % or less.

For the expression of improved light resistance according to the present disclosure, the microcellulose fibers are preferably contained in the polymer composite in an amount of 5 wt % or more. However, an excessive amount of the reinforcing material may impair compatibility with the polymer matrix, thereby reducing mechanical properties of the polymer composite. Therefore, it is preferable that the microcellulose fibers are contained in the polymer composite in an amount of 60 wt % or less, or 55 wt % or less.

In order to allow proper compatibility to be expressed, the compatibilizer may be contained in the polymer composite in an amount of 1 wt % or more, or 5 wt % or more. However, an excessive amount of the compatibilizer may deteriorate mechanical properties of the polymer composite. Therefore, the compatibilizer is preferably contained in the polymer composite in an amount of 20 wt % or less, or 15 wt % or less.

Optionally, the polymer composite may include a colorant. The addition of the colorant may advantageously act to lower the color difference of the polymer composite. The colorant may be added in an amount of 0.1 to 5 wt %, 0.5 to 5 wt %, 1 to 5 wt %, or 1 to 3 wt % based on a total weight of the polymer matrix, the microcellulose fiber, and the compatibilizer.

According to an embodiment of the present disclosure, the polymer composite may be obtained by mixing the above-mentioned components in a mixer, followed by curing. As a non-limiting example, the polymer composite can be obtained by mixing the above-mentioned components in a batch mixer at 100 to 180° C., preparing a master batch in the form of pellets, and injecting the master batch into an extruder for extrusion and injection.

According to an embodiment of the present disclosure, the polymer composite may exhibit improved light resistance while being environmentally friendly by containing the above-described components.

For example, polymer composite may have a color difference ($\Delta E^*_{ab}$) satisfying the following Equation 1:

$$2 \leq \Delta E^*_{ab} 15 \quad \text{[Equation 1]}$$

in the Equation 1, the color difference ($\Delta E^*_{ab}$) is obtained by the following formula of $[(L^*t-L^*_0)^2+(a^*_t-a^*_0)^2+(b^*_t-b^*_0)^2]^{1/2}$ in the L*a*b* color space measured using a colorimeter.

Herein, $L^*_0$, $a^*_0$ and $b^*_0$ are initial chromaticity values of the polymer composite. In addition, L*t, a*t and b*t are chromaticity values of the polymer composite after exposing the polymer composite to a light source (fluorescent UV lamp) for 480 hours under the conditions of 0.75 W/(m²·nm) at 340 nm and 45±1° C.

In addition, the color difference may be obtained by a method of measuring the change in chromaticity after a weather resistance test according to ISO 4892-3 for the polymer composite.

Preferably, the polymer composite may have a color difference of 15.0 or less, or 14.5 or less; and 1.0 or more, 1.5 or more, or 2.0 or more. Specifically, the polymer composite may have the color difference of 1.0 to 15.0, 1.5 to 15.0, 2.0 to 15.0, 1.0 to 14.5, 1.5 to 14.5, or 2.0 to 14.5.

The polymer composite may have tensile strength of 35 MPa or more, 40 MPa or more, or 42 MPa or more; and 65 MPa or less, or 60 MPa or less, when measured according to ASTM D638-5 for a dog-bone-shaped specimen (or a dumbbell-shaped specimen) prepared from the polymer composite according to ASTM D638-5. Preferably, the polymer composite may have tensile strength of 35 to 65 MPa, 40 to 65 MPa, 40 to 60 MPa, or 42 to 60 MPa. ASTM D638 provides a standard test method for determining the tensile properties of plastics. The tensile properties of the polymer composite are measured according to specimen Type V of ASTM D638. ASTM D638 is performed by applying a tensile force to the specimen and measuring the tensile properties of the specimen under stress. This may be performed at a constant tensile rate in the range of 1 to 500 mm/min until the specimen is broken (yield or fractured) using a conventional tensile testing machine. The tensile strength is the amount of force that can be applied until the specimen yields or breaks.

As another example, the polymer composite may have flexural strength measured according to ISO 178 for a specimen having a size of 80 mm×10 mm×4 mm prepared from the polymer composite of 50 MPa or more, or 55 MPa or more; and 85 MPa or less, or 80 MPa or less. Preferably, the polymer composite may have the flexural strength of 50 to 85 MPa, 50 to 80 MPa, or 55 to 80 MPa.

In addition, the polymer composite may have flexural modulus measured according to ISO 178 for a specimen having a size of 80 mm×10 mm×4 mm prepared from the polymer composite of 1.0 GPa or more, 1.5 GPa or more, or 1.7 GPa or more; and 3.5 GPa or less, 3.2 GPa or less, or 3.0 GPa or less. Preferably, the polymer composite may have the flexural modulus of 1.0 GPa to 3.5 GPa, 1.5 GPa to 3.5 GPa, 1.5 GPa to 3.2 GPa, 1.7 GPa to 3.2 GPa, or 1.7 GPa to 3.0 GPa.

ISO 178 provides a standard test method for determining flexural properties of plastics by performing a three-point bend test. The three-point bend test applies force at the midpoint of a rectangular specimen. The applied force is measured by a load cell, and the resulting deflection is measured by either crosshead displacement or by a direct strain measurement device. This may be performed by applying the force to the specimen at a constant speed in the range of 1 to 500 mm/min using a conventional flexural testing machine. The flexural strength is the maximum flexural stress obtained during the flexural test. The flexural stress is a function of applied load, span, specimen width, and specimen thickness, and measured using a flexural tester.

The polymer composite can exhibit improved light resistance while being environmentally friendly, and thus can be applied to lightweight materials for automobiles such as interior and exterior materials for automobiles, interior and exterior materials for home appliances, packaging materials, etc.

Advantageous Effects

In the present disclosure, there is provided a polymer composite capable of exhibiting improved light resistance while being environmentally friendly by containing microcellulose fibers fibrillated by the growth of inorganic particles as a reinforcing material.

BRIEF DESCRIPTION OF THE DRAWINGS

FIG. 1A shows an enlarged schematic view of non-fibrillated microcellulose fibers and FIG. 1B shows an enlarged schematic view of microcellulose fibers including nanofibrils and inorganic particles.

FIG. 2, and FIGS. 4A and 4B are scanning electron microscope (SEM) images of cellulose fibers fibrillated by the growth of inorganic particles according to Preparation Example 1 below.

FIG. 3 is a SEM image of cellulose fibers fibrillated by the growth of inorganic particles according to Preparation Example 4 below.

FIG. 5A shows a SEM image of miniaturized cellulose fibers complexed with inorganic particles according to Preparation Example 5 below, and FIG. 5B shows a SEM image of a SEM image of FIG. 5A taken at a higher magnification.

FIG. 6 shows specifications of a dog-bone-shaped specimen (or a dumbbell-shaped specimen) for measuring tensile strength according to Type V of ASTM D638 (unit: mm).

DETAILED DESCRIPTION OF THE EMBODIMENTS

Hereinafter, the function and effect of the present invention will be described in more detail through specific examples. However, these examples are for illustrative purposes only, and the invention is not intended to be limited by these examples.

Preparation Example 1

(Preparation of Fibrillated Cellulose Fibers)

Hardwood kraft fibers (average fiber length: 0.692 mm, average minor axis diameter: 15.8 µm) were prepared as cellulose raw materials. An aqueous solution in which 20 g of zinc acetate was dissolved in 1000 g of distilled water was prepared. 20 g of the fibers were added to the aqueous solution and stirred at 200 rpm for 1 hour to obtain a mixture.

7.2 g of sodium hydroxide (NaOH) was added to the mixture as a reducing agent at 50° C., and heated to 95° C., followed by stirring at 200 rpm for 4 hours to grow inorganic particles on the fibers. The content of the inorganic particles was confirmed to be 8 parts by weight based on 100 parts by weight of the fibers.

As shown in FIG. 2, it was confirmed using a scanning electron microscope (SEM) that fibrillation occurred in the fiber portion on which inorganic particles (ZnO) were grown. As a result of analyzing the SEM image, it was confirmed that the inorganic particles had a uniform particle diameter of about 100 nm (see FIG. 2). In addition, it was confirmed that metal elements (zinc) and oxygen were evenly distributed on the fibrillated cellulose fibers by the growth of the inorganic particles (see FIGS. 4A and 4B).

Preparation Example 2

(Preparation of Fibrillated Cellulose Fibers)

Fibrillated cellulose fibers were prepared in the same manner as in Preparation Example 1, except that the content of zinc acetate was controlled such 2 that the content of the inorganic particles was 12.5 parts by weight based on 100 parts by weight of the fibers.

As a result of analyzing the SEM image, it was confirmed that the inorganic particles had a uniform particle diameter of about 100 nm.

Preparation Example 3

(Preparation of Fibrillated Cellulose Fibers)

Fibrillated cellulose fibers were prepared in the same manner as in Preparation Example 1, except that the content of zinc acetate was controlled such that the content of the inorganic particles was 25 parts by weight based on 100 parts by weight of the fibers.

As a result of analyzing the SEM image, it was confirmed that the inorganic particles had a uniform particle diameter of about 100 nm.

Preparation Example 4

Preparation of Fibrillated Cellulose Fibers

Fibrillated cellulose fibers were prepared in the same manner as in Preparation Example 1, except that calcium carbonate ($CaCO_3$) was used instead of zinc acetate and the content of calcium carbonate was controlled such that the content of the inorganic particles was 45 parts by weight based on 100 parts by weight of the fibers.

As a result of analyzing the SEM image, it was confirmed that the inorganic particles having a particle diameter of 100 nm were aggregated to form non-uniform aggregates (~1 µm) (see FIG. 3).

Preparation Example 5

Preparation of Miniaturized Cellulose Fibers

Hardwood kraft fibers were prepared as cellulose raw materials as in Preparation Example 1. A surface of the fibers was oxidized using 2,2,6,6-tetramethylpiperidinyl-1-oxyradical (TEMPO) as a catalyst to obtain oxidized pulp.

g of the oxidized pulp was dispersed in 99 g of distilled water and miniaturized (defibrated) with a mixer for 30 minutes to obtain an aqueous dispersion of miniaturized cellulose at a concentration of 1%.

A zinc acetate aqueous solution was prepared by dissolving 20 g of zinc acetate in 1000 g of distilled water. 3.6 g of sodium hydroxide (NaOH) was dissolved in 10 ml of distilled water to prepare a sodium hydroxide solution.

While stirring 100 g of the aqueous dispersion of miniaturized cellulose at 15° C., 50 ml of the zinc acetate aqueous solution and 10 ml of the sodium hydroxide solution were added thereto, followed by stirring at 500 rpm for 2 hours to prepare a composite of zinc oxide (ZnO) particles and miniaturized cellulose.

As shown in FIGS. 5A and 5B, it was confirmed using a scanning electron microscope that the composite of zinc oxide particles and miniaturized cellulose according to Preparation Example 5 had strong bonding strength and aggregation between the miniaturized celluloses, so that nanofibers were aggregated and the dispersion degree of particles was low.

Example 1

30 wt % of fibrillated cellulose fibers according to Preparation Example 1, 60 wt % of homopolypropylene (melt flow rate (MFR) according to ASTM D1238: 60 g/10 min) and 10 wt % of a compatibilizer were added to a batch mixer, and mixed at 160° C. for 20 minutes to prepare a master batch in the form of pellets. As the compatibilizer, maleic anhydride-grafted polypropylene (acid number according to ASTMD-1386 (2010): 20 mg KOH/g) was used.

The master batch was put into a twin-screw extruder to perform a compounding process, and then extruded. The mixture obtained through the extrusion was put back into an injection machine and then injected, thereby obtaining a polymer composite specimen.

Example 2

A polymer composite specimen was obtained in the same manner as in Example 1, except that the fibrillated cellulose fibers according to Preparation Example 2 was used instead of Preparation Example 1.

Example 3

A polymer composite specimen was obtained in the same manner as in Example 1, except that the fibrillated cellulose fibers according to Preparation Example 3 was used instead of Preparation Example 1.

Example 4

A polymer composite specimen was obtained in the same manner as in Example 1, except that the fibrillated cellulose fibers according to Preparation Example 3 was used instead of Preparation Example 1, and a master batch was prepared by additionally adding and mixing 3 wt % of a black colorant (NB9096) based on the weight of the compounds added to the batch mixer.

Example 5

A polymer composite specimen was obtained in the same manner as in Example 1, except that 55 wt % of the fibrillated cellulose fibers according to Preparation Example 3, 35 wt % of polypropylene, and 10 wt % of a compatibilizer were added to the batch mixer.

Example 6

A polymer composite specimen was obtained in the same manner as in Example 1, except that 5 wt % of the fibrillated cellulose fibers according to Preparation Example 3, 85 wt % of polypropylene, and 10 wt % of a compatibilizer were added to the batch mixer.

Comparative Example 1

A polymer composite specimen was obtained in the same manner as in Example 1, except that the fibrillated cellulose fibers according to Preparation Example 4 was used instead of Preparation Example 1.

Comparative Example 2

A polymer composite specimen was obtained in the same manner as in Example 1, except the hardwood kraft fibers used in Preparation Example 1 which were soaked in water and swollen were applied instead of the fibrillated cellulose fibers according to Preparation Example 1.

Comparative Example 3

A polymer composite specimen was obtained in the same manner as in Example 1, except that the miniaturized cellulose fibers according to Preparation Example 5 was used instead of Preparation Example 1.

Test Examples

The physical properties of the specimens prepared in Examples and Comparative Examples were evaluated by the following method, and the results are shown in Table 1 and Table 2 below.

(1) Mirror Axis Diameter of Fiber

The minor axis diameter of the cellulose fibers (the shortest diameter in the cross section of fiber) prepared in Preparation Examples was measured using a scanning electron microscope.

Specifically, in the case of microcellulose fibers, the minor axis diameters of 10 microfibers per each sample were measured and displayed in a range excluding the maximum and minimum values. In the case of nanofibrils, the minor axis diameters of 20 nanofibrils per each sample were measured, and displayed in a range excluding the maximum and minimum values.

In Preparation Example 5, the cellulose fibers were miniaturized (defibrated), and then complexed with particles unlike Preparation Examples 1 to 4. The minor axis diameter of nanofibrils of Preparation Example 5 in Table 1 below means the minor axis diameter of the miniaturized cellulose after complexing with particles.

(2) Light Resistance

Using a weather resistance tester (model name: QUV ACCELERATED WEATHERING TESTER, manufacturer: Q-LAB), a specimen was exposed to a light source (fluorescent UV lamp) under the conditions of 0.75 W/(m²·nm) @340 nm and 45±1° C. for 480 hours.

Chromaticity values of the specimen before and after exposure to the light were measured using a colorimeter (model name: Ci7860, manufacturer: X-rite). Using the measured chromaticity values of L*a*b*, the color difference ($\Delta E^*_{ab}$) was obtained by the following formula of $[(L^*_t-L^*_0)^2+(a^*_t-a^*_0)^2+(b^*_t-b^*_0)^2]^{1/2}$ In the above formula, $L^*_0$, $a^*_0$ and $b^*_0$ are initial chromaticity values of the specimen before exposure to light; and $L^*_t$, $a^*_t$ and $b^*_t$ are chromaticity values of the specimen after exposure to light.

(3) Tensile Strength

The following specimen (FIG. 6) was prepared according to the standard of specimen Type V of ASTM D638. The specimen was left for 24 hours in a constant temperature and humidity room adjusted to a temperature of 23° C. and a relative humidity of 50%, and then subjected to a tensile test.

The tensile strength (MPa) of the specimen was measured according to ASTM D638 using a universal testing machine (UTM) manufactured by Instron. In accordance with ASTM D638, a gap between the grips holding the specimen at both ends was set to 25.4 mm, and the test was performed at a constant tensile rate with a crosshead speed of 5 mm/min.

(4) Flexural Strength and Flexural Modulus

A specimen having a size of 80 mm×10 mm×4 mm was prepared according to ISO 178. The specimen was left for 24 hours in a constant temperature and humidity room adjusted to a temperature of 23° C. and a relative humidity of 50%, and then subjected to a flexural test.

The flexural strength (MPa) of the specimen was measured according to ISO 178 using a universal testing machine (UTM) manufactured by Instron. In accordance with ISO 178, a supports span was set to 46 mm using a three-point flexural test jig, and flexural strength was obtained by performing a flexural test under a crosshead speed of 5 mm/min.

TABLE 1

| | Minor axis diameter | | |
| --- | --- | --- | --- |
| | Microcellulose fibers (μm) | Nanofibrils (nm) | Size of inorganic particles (μm) |
| Preparation Example 1 | 1~10 | 50~100 | 0.05~0.1 |
| Preparation Example 2 | 1~10 | 50~100 | 0.05~0.5 |
| Preparation Example 3 | 1~10 | 50~100 | 0.1~1 |
| Preparation Example 4 | 1~10 | 50~100 | 0.1~1 |
| Preparation Example 5 | none | 10~100 | 0.1~1 |

TABLE 2

| | | Color difference (ΔE*ab) | Flexural strength (MPa) | Flexural modulus (GPa) | Tensile strength (MPa) |
| --- | --- | --- | --- | --- | --- |
| Examples | 1 | 14.4 | 62 | 2.3 | 51 |
| | 2 | 13.2 | 64 | 2.3 | 52 |
| | 3 | 8.4 | 65 | 2.6 | 54 |
| | 4 | 2.0 | 65 | 2.5 | 55 |
| | 5 | 5.0 | 79 | 3.0 | 60 |
| | 6 | 10.0 | 55 | 1.7 | 42 |
| Comparative Examples | 1 | 15.7 | 63 | 2.6 | 56 |
| | 2 | 17.0 | 62 | 2.6 | 55 |
| | 3 | 15.2 | 45 | 1.7 | 31 |

Referring to Table 2, it was confirmed that the polymer composites according to Examples exhibited superior light resistance compared to the polymer composite according to Comparative Example 1.

The invention claimed is:

1. A polymer composite containing a polymer matrix; microcellulose fibers; and a compatibilizer, and satisfying Equation 1:

$$2 \leq \Delta E^*_{ab} \leq 15 \quad \text{[Equation 1]}$$

in the Equation 1, $\Delta E^*_{ab}$ is a color difference of the polymer composite, and the color difference is obtained according to formula of $[(L^*_t-L^*_0)^2+(a^*_t-a^*_0)^2+(b^*_t-b^*_0)^2]^{1/2}$ in L*a*b* color space measured using a colorimeter, wherein $L^*_0$, $a^*_0$ and $b^*_0$ are initial chromaticity values of the polymer composite, and $L^*_t$, $a^*_t$ and $b^*_t$ are chromaticity values of the polymer composite after exposing the polymer composite to a fluorescent UV lamp for 480 hours under conditions of 0.75 W/(m²·nm) at 340 nm and 45±1° C., wherein the microcellulose fibers comprise nanofibrils and inorganic particles, wherein the nanofibrils are bonded to a surface of the microcellulose fibers, and the inorganic particles are bonded to the nanofibrils or bonded to a surface or inside of the microcellulose fibers.

2. The polymer composite of claim 1,
wherein the microcellulose fibers have a minor axis diameter of 1 μm to 30 μm, and
the nanofibrils have a minor axis diameter of 10 nm to 400 nm.

3. The polymer composite of claim 1,
wherein the inorganic particles comprise spherical particles having a diameter of 0.01 μm to 10 μm; columnar particles having a diameter of 0.01 μm to 10 μm on one axis and a diameter of 0.02 μm to 30 μm on another axis; or a mixture thereof.

4. The polymer composite of claim 1,
wherein the inorganic particles comprise at least one element of copper, zinc, calcium, aluminum, iron, silver, platinum, palladium, ruthenium, iridium, rhodium, osmium, chromium, cobalt, nickel, manganese, vanadium, molybdenum, magnesium, strontium, titanium, zirconium, hafnium, or gallium.

5. The polymer composite of claim 1,
wherein the inorganic particles are contained in an amount of 1 to 40 parts by weight based on 100 parts by weight of the microcellulose fibers.

6. The polymer composite of claim 1,
wherein the polymer composite contains 30 to 90 wt % of the polymer matrix;
5 to 60 wt % of the microcellulose fibers; and
1 to 20 wt % of the compatibilizer.

7. The polymer composite of claim 1,
wherein the polymer matrix is at least one polymer selected from the group consisting of polyolefin, polyamide, styrenic polymer, and polycarbonate.

8. The polymer composite of claim 1,
wherein the compatibilizer comprises a modified polyolefin.

9. The polymer composite of claim 1,
wherein the polymer composite has a tensile strength of 35 MPa to 65 MPa as measured according to ASTM D638-5 for an ASTM D638-5 standard specimen prepared from the polymer composite is 35 MPa to 65 MPa.

10. The polymer composite of claim 1,
wherein the polymer composite has a flexural strength of 50 MPa to 85 MPa as measured according to ISO 178 for a specimen having a size of 80 mm×10 mm×4 mm prepared from the polymer composite.

11. The polymer composite of claim 1,
wherein the polymer composite has a flexural modulus of 1.0 GPa to 3.5 GPa as measured according to ISO 178 for a specimen having a size of 80 mm×10 mm×4 mm prepared from the polymer composite.

12. The polymer composite of claim 1,
wherein the microcellulose fibers and the compatibilizer are dispersed in the polymer matrix.

13. The polymer composite of claim 8,
wherein the modified polyolefin is a resin obtained by modifying a polyolefin with an unsaturated carboxylic acid or a derivative thereof.

* * * * *